United States Patent
Roberge

(10) Patent No.: US 10,400,709 B2
(45) Date of Patent: Sep. 3, 2019

(54) AUXILIARY DEVICE FOR THREE AIR FLOW PATH GAS TURBINE ENGINE

(71) Applicant: United Technologies Corporation, Hartford, CT (US)

(72) Inventor: Gary D. Roberge, Tolland, CT (US)

(73) Assignee: United Technologies Corporation, Farmington, CT (US)

( * ) Notice: Subject to any disclaimer, the term of this patent is extended or adjusted under 35 U.S.C. 154(b) by 1193 days.

(21) Appl. No.: 14/458,619

(22) Filed: Aug. 13, 2014

(65) Prior Publication Data

US 2015/0267551 A1    Sep. 24, 2015

Related U.S. Application Data

(60) Provisional application No. 61/880,207, filed on Sep. 20, 2013.

(51) Int. Cl.
| | | |
|---|---|---|
| *F02C 3/13* | (2006.01) | |
| *F02C 7/36* | (2006.01) | |
| *F02C 9/18* | (2006.01) | |
| *F02K 3/00* | (2006.01) | |
| *F02K 3/02* | (2006.01) | |
| *F02K 3/10* | (2006.01) | |
| *F02K 3/075* | (2006.01) | |
| *F02K 3/077* | (2006.01) | |

(52) U.S. Cl.
CPC .............. *F02K 3/075* (2013.01); *F02C 3/13* (2013.01); *F02C 7/36* (2013.01); *F02C 9/18* (2013.01); *F02K 3/00* (2013.01); *F02K 3/02* (2013.01); *F02K 3/077* (2013.01); *F02K 3/10* (2013.01)

(58) Field of Classification Search
CPC ... F02K 3/06; F02K 3/075; F02K 3/04; F02K 3/07; F02K 3/077; F02K 3/025; F02K 3/10; F02K 3/11; F02C 7/12; F02C 7/18; F02C 7/32; F02C 7/185; F02C 3/073; F02C 3/13; F02C 9/18; F16C 2360/23; F16C 2361/165
USPC ......... 60/226.3, 762, 761, 269, 262, 39.163, 60/39.41
See application file for complete search history.

(56) References Cited

U.S. PATENT DOCUMENTS

| | | | | |
|---|---|---|---|---|
| 3,713,748 A | * | 1/1973 | Langley | ............ F02K 3/06 415/119 |
| 4,054,030 A | * | 10/1977 | Pedersen | ......... F02K 3/075 415/145 |
| 4,072,008 A | * | 2/1978 | Kenworth | ........ F02K 3/075 60/262 |
| 5,363,641 A | * | 11/1994 | Dixon | ............ F02C 6/08 60/226.1 |
| 5,433,674 A | * | 7/1995 | Sheridan | ......... F16H 1/2809 475/346 |
| 5,806,303 A | * | 9/1998 | Johnson | ............ F02K 1/30 60/226.1 |

(Continued)

*Primary Examiner* — Andrew H Nguyen
*Assistant Examiner* — Stephanie Cheng
(74) *Attorney, Agent, or Firm* — Carlson, Gaskey & Olds, P.C.

(57) ABSTRACT

A gas turbine engine has a fan rotor including at least one stage, with the at least one stage delivering a portion of air into a low pressure duct, and another portion of air into a compressor. The compressor is driven by a turbine rotor, and the fan rotor is driven by a fan drive turbine. A channel selectively communicates air from the low pressure duct across a boost compressor.

1 Claim, 5 Drawing Sheets

(56) References Cited

U.S. PATENT DOCUMENTS

| | | | | |
|---|---|---|---|---|
| 5,867,980 | A * | 2/1999 | Bartos | F02K 7/16 60/226.1 |
| 6,305,156 | B1 * | 10/2001 | Lui | B64D 13/06 454/76 |
| 6,901,739 | B2 * | 6/2005 | Christopherson | F01D 17/105 60/226.3 |
| 7,059,136 | B2 * | 6/2006 | Coffinberry | F02C 6/08 60/226.1 |
| 7,216,475 | B2 * | 5/2007 | Johnson | F02K 3/065 60/226.1 |
| 7,246,484 | B2 * | 7/2007 | Giffin, III | F02K 3/072 60/226.3 |
| 7,395,657 | B2 * | 7/2008 | Johnson | B64D 33/02 244/53 B |
| 7,614,210 | B2 * | 11/2009 | Powell | F02K 1/08 60/226.1 |
| 7,788,898 | B2 * | 9/2010 | Kern | F02C 3/113 60/204 |
| 8,082,727 | B2 * | 12/2011 | Roberge | F02C 3/13 60/226.1 |
| 8,365,514 | B1 * | 2/2013 | Kupratis | F02K 3/06 60/226.1 |
| 8,695,324 | B2 * | 4/2014 | Giffin | F01D 5/022 60/226.1 |
| 2011/0171007 | A1 * | 7/2011 | Johnson | F01D 17/162 415/145 |
| 2013/0133332 | A1 | 5/2013 | MacFarlane | |

\* cited by examiner

AUXILIARY DEVICE FOR THREE AIR FLOW PATH GAS TURBINE ENGINE

CROSS-REFERENCE TO RELATED APPLICATION

This application claims priority to U.S. Provisional Application No. 61/880,207, filed Sep. 20, 2013.

BACKGROUND

This application relates to a gas turbine engine having a lower pressure air flow path selectively driven across a boost compressor.

Gas turbine engines are known and include a fan delivering air into a bypass duct and into a core engine compressor. The bypass duct air flow path is utilized as propulsion and the core air flow path in the compressor is compressed, mixed with fuel in a combustor, and ignited. Products of this combustion pass downstream over turbine rotors, driving them to rotate.

In some applications and, in particular, in military applications, the ability to provide adaptive performance including the generation of very high thrust in a very short period of time is desirable. In one proposed engine of this type, a secondary mid-fan supplied third air flow path is provided, which is at a lower pressure than the fan discharge supplied primary bypass air flow path.

This third air flow path may be utilized for various lower pressure applications, such as cooling. However, this third air flow path is at a relatively low pressure, particularly when compared to the pressure in an exhaust nozzle. As such, downstream uses for this third air flow path are limited.

SUMMARY

In a featured embodiment, a gas turbine engine has a fan rotor including at least one stage, with the at least one stage delivering a portion of air into a low pressure duct, and another portion of air into a compressor. The compressor is driven by a turbine rotor, and the fan rotor is driven by a fan drive turbine. A channel selectively communicates air from the low pressure duct across a boost compressor.

In another embodiment according to the previous embodiment, the fan rotor includes at least two stages, with an upstream fan stage delivering a portion of air into the low pressure duct, and another portion across a downstream fan stage. Air passed downstream of the downstream fan stage is delivered into the compressor and into a bypass duct.

In another embodiment according to any of the previous embodiments, the fan rotor drives at least three stages, with the first stage fan being the upstream fan stage, and a third stage fan being the downstream fan stage. The second stage fan is intermediate the first and the third stage fan.

In another embodiment according to any of the previous embodiments, the low pressure duct is a bypass duct.

In another embodiment according to any of the previous embodiments, air downstream of the boost compressor is utilized as cooling air.

In another embodiment according to any of the previous embodiments, air downstream of the boost compressor is delivered into an exhaust gas downstream of the fan drive turbine.

In another embodiment according to any of the previous embodiments, an augmentor section is positioned adjacent an exhaust nozzle and air from the boost compressor is directed towards the augmentor section.

In another embodiment according to any of the previous embodiments, a valve selectively blocks or allows flow through the low pressure duct to an outlet. When the valve is blocking flow, more air is moved into the channel and across the boost compressor.

In another embodiment according to any of the previous embodiments, the boost compressor is driven by the fan drive turbine.

In another embodiment according to any of the previous embodiments, a gear box is positioned between the fan drive turbine and the boost compressor, with the gear box affecting a speed change between the fan drive turbine and the boost compressor.

In another embodiment according to any of the previous embodiments, a connection between the gear box and the boost compressor is a flexible connection.

In another embodiment according to any of the previous embodiments, a clutch selectively connects or disconnects drive from the gear box to and the boost compressor.

In another embodiment according to any of the previous embodiments, the clutch is moved to connect drive from the gear box to the boost compressor when the valve blocks flow through the low pressure duct to the outlet. The clutch disconnects drive from the gear box to the boost compressor when the valve allows flow from the low pressure duct to the outlet.

In another embodiment according to any of the previous embodiments, an exhaust cone positioned downstream of the boost compressor is moveable to change a flow cross-sectional area downstream of the boost compressor.

In another embodiment according to any of the previous embodiments, the channel passes through a turbine exhaust case strut.

In another embodiment according to any of the previous embodiments, a gear box is positioned between the fan drive turbine and the boost compressor, with the gear box affecting a speed change between the fan drive turbine and the boost compressor In another embodiment according to any of the previous embodiments, a clutch selectively connects or disconnects drive from the gear box to the boost compressor.

In another embodiment according to any of the previous embodiments, a clutch selectively connects or disconnects drive from the fan drive turbine to the boost compressor.

In another embodiment according to any of the previous embodiments, an exit cone positioned downstream of the boost compressor is moveable to change a downstream flow cross-sectional area for the boost compressor.

In another embodiment according to any of the previous embodiments, air downstream of the boost compressor is delivered into an exhaust gas flow downstream of the fan drive turbine.

These and other features may be best understood from the following drawings and specification.

DETAILED DESCRIPTION

Figure 1A:
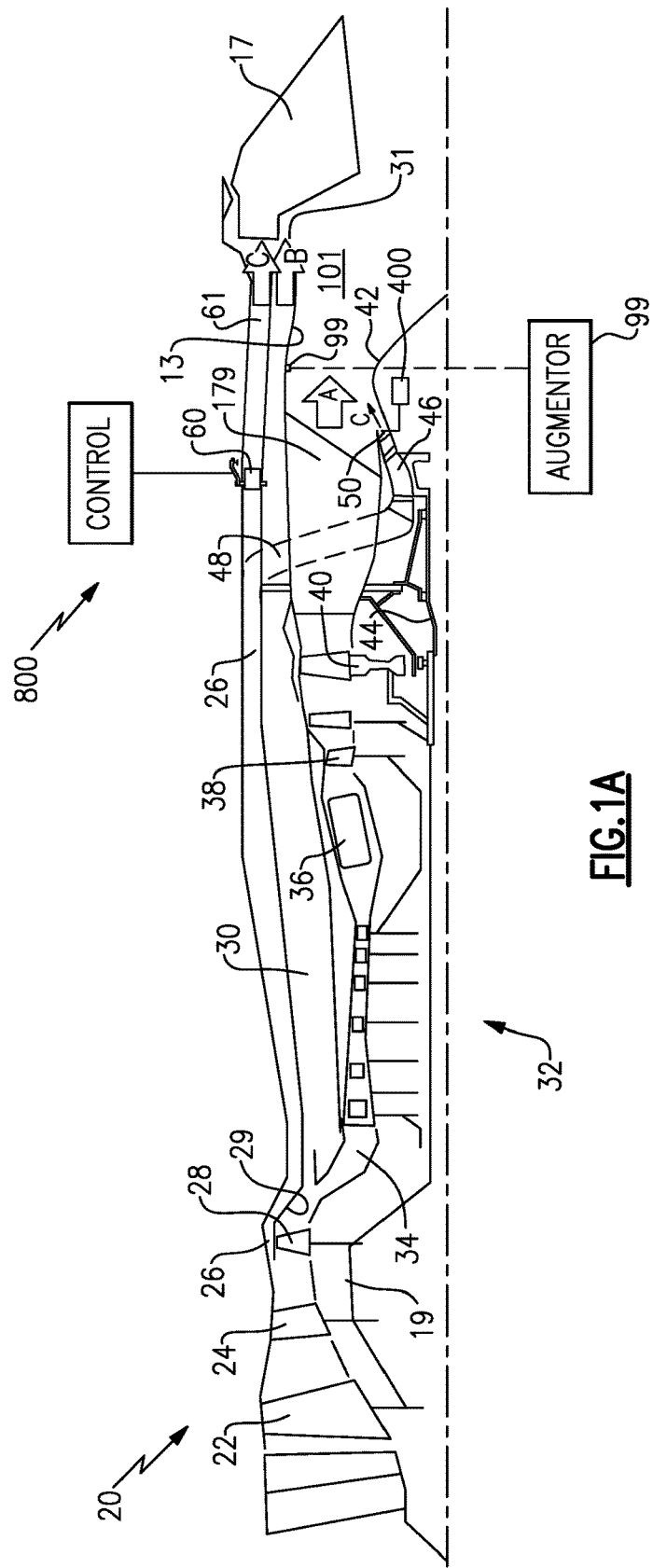
FIG. 1A shows an engine in a first position.

An engine 20 includes a first stage fan 22, and a second stage fan 24. A fan rotor 19 drives the first stage and second stage fans 22 and 24, and also drives a third stage fan 28. The fan rotor 19 is driven to rotate by a fan drive turbine 40.

A portion of the air downstream of the second stage fan 24 is delivered into a duct 26 as low pressure, low temperature intermediate flow. This is known as a "third air flow path (C)."

A portion of air from the second stage fan 24 is also delivered across the third stage fan 28. The air passing into duct 26 does not pass over third stage fan 28, which is received within a housing 29. A portion of the air downstream of the third stage fan 28 is delivered as a bypass air flow path ("B") into a duct 30, and exits at a downstream end 31 as air for cooling and propulsion. A variable nozzle 17 may also be included at downstream end 31.

Another portion of the air downstream of the third stage fan 28 is delivered into a core air flow path ("A") at duct 34 and passes across a compressor 32. The compressor 32 compresses the air and delivers it into a combustor 36 where it is mixed with fuel and ignited.

Downstream of the combustor 36, the air crosses a turbine rotor 38, which drives the compressor 32. Downstream of the turbine rotor 38, the air passes across the fan drive turbine 40. An exhaust cone 42 is shown near a downstream end 31 and within an exhaust duct 13. A variable nozzle 17 is downstream of exhaust duct 13.

As shown in FIG. 1A, air from the duct 26 may be selectively brought through a plurality of channels 48 (only one of which is shown), which are formed within a turbine exhaust case strut 179. The air from the channels 48 passes across a boost compressor 46, which is also driven by the fan drive turbine 40 through a linkage 44. This then raises the pressure of the air in the third air flow path such that when it exits at outlet 50, it is at a high enough pressure that it may move into a flow of exhaust gas 101. Alternatively, the air from exit 50 may be tapped in whole or in part to a use 400, shown schematically, such as a cooling use.

A valve 60 is in an open position in FIG. 1A and the flow of air would, thus, generally pass to an outlet 61, as the third air flow path propulsion. A smaller volume of air may actually pass into channels 48 and to the boost compressor 46 in this open position.

Figure 1B:
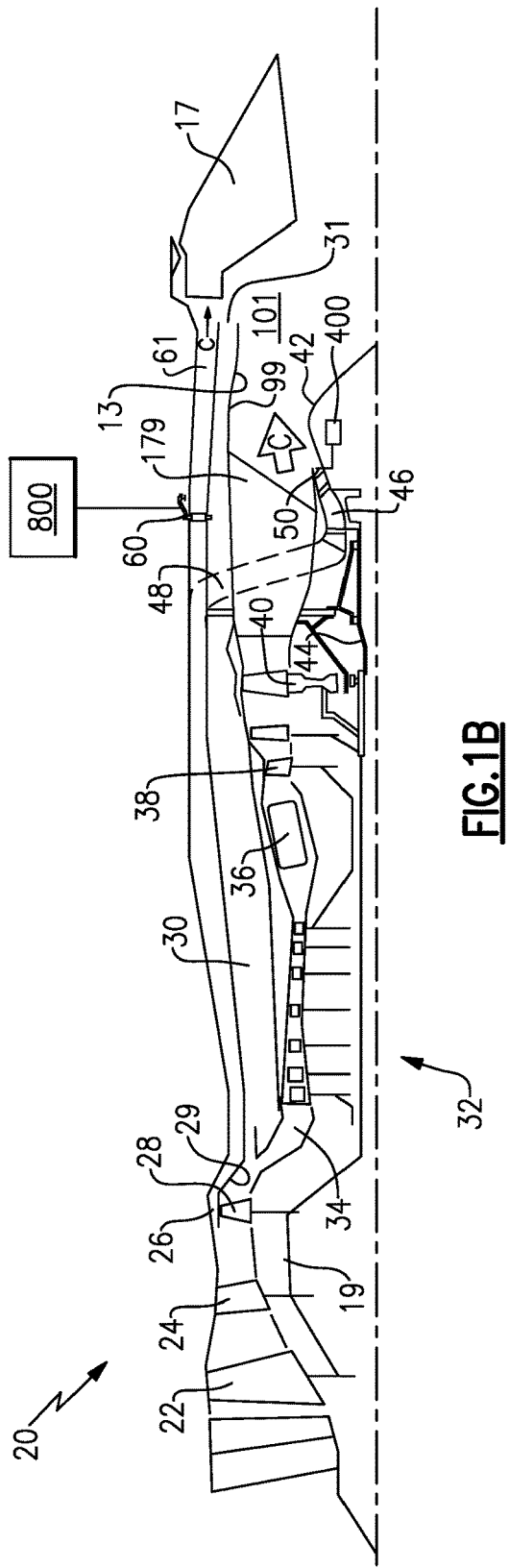
FIG. 1B shows the engine in a second position.

However, as shown in FIG. 1B, the valve 60 is moved to a closed position to block flow through the duct 26 and a higher portion of the third air flow path in duct 26 passes into channels 48 and across the boost compressor 46 and to the outlet 50. Now, there is additional air within the variable nozzle 17 as propulsion air.

The size of the letter C is shown large and small in the Figures to illustrate the relative volumes of air flow in the two positions.

In addition, an augmentor 99 may be positioned adjacent downstream end 31. Augmentor 99 is shown schematically, but, as known, provides a final burn by mixing additional fuel into the exhaust gas 101. The third air flow path from the duct 26 will have a higher oxygen content than would the air in exhaust gas 101 otherwise downstream of the fan drive turbine 40, since the gases passing across fan drive turbine 40 have been combusted. Thus, the air from duct 26 passing across boost compressor 46 and out of outlet 50 to be directed towards the augmentor will increase the efficiency of the augmentor function.

A control 800 controls the position of valve 60 to achieve the desired use of the third air flow path. As can be appreciated, air directed into channel 48 passes across the boost compressor 46 and is mixed with the airflow A which has passed through the combustor 36, and across the fan drive turbine 40. Air which continues to the outlet 61 of the duct 26 exits at the outlet 61 downstream of the augmentor 99.

Figure 2A:
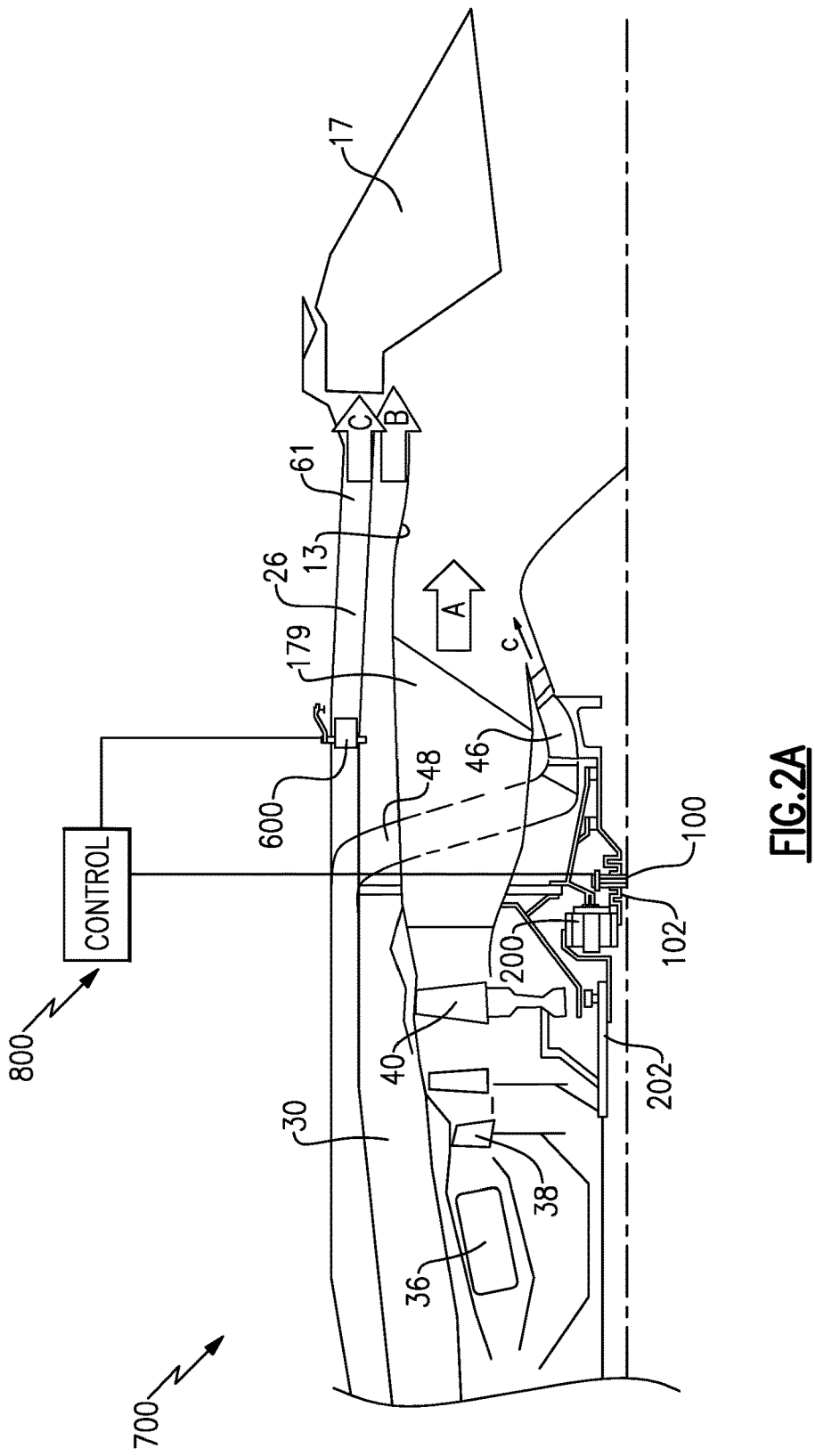
FIG. 2A shows a second embodiment in a first position.
Figure 2B:
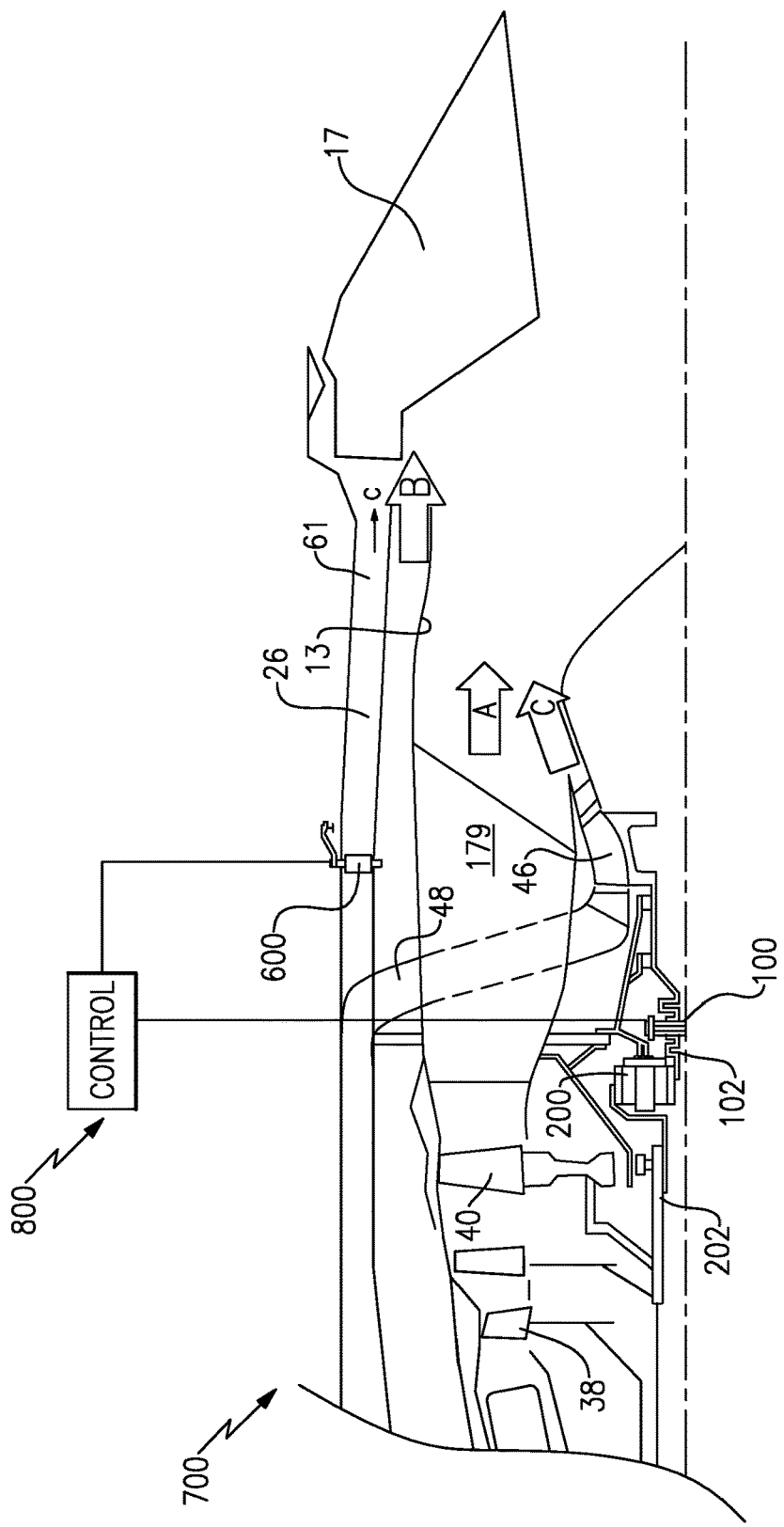
FIG. 2B shows the second embodiment in a second position.

FIG. 2A shows an open position for a second embodiment 700. In embodiment 700, a gear box 200 is connected through a linkage 202 to be driven by the fan drive turbine 40. The gear box is connected by a flexible coupling 102 to a clutch 100. Clutch 100 selectively drives a boost compressor 46. A control 800, shown schematically, selectively operates the clutch 100 in combination of the control of the valve 600, as shown in FIGS. 2A and 2B, such that air flow may be directed almost entirely through the duct 26, or almost entirely across the boost compressor 46.

When the clutch 100 is disconnected, as shown in FIG. 2A, then the air flow is not driven across the boost compressor 46. Instead, the air flow will largely pass toward the outlet 61. On the other hand, when the clutch 100 is connected, as shown in FIG. 2B, it does drive the boost compressor 46, which will draw the majority of air flow across the boost compressor 46.

Clutch 100 is shown schematically, but would operate as known clutches to not drive the boost compressor 46 through the gear box 200 in the disconnected position. Alternatively, when connected, it will drive the boost compressor.

The valve 600 is controlled by control 800 in combination with control of clutch 100. The clutch 100 is controlled in combination with the valve 600, such that the valve 600 is open as shown in FIG. 2A, and the clutch 100 is disconnected. Thus, most of the air in the duct 26 will pass to outlet 61, and only a small portion of the air will pass into channels 48, and to the boost compressor 46. On the other hand, when the valve 600 is closed, and the clutch 100 is connected, as shown in FIG. 2B, the majority of the air will flow into the channels 48, and across the boost compressor 46, and little or no air will pass to the outlet 61.

The gear box 200 provides an increase of speed at the boost compressor 46 or a decrease of speed. Either speed change would provide the designer of the gas turbine engine additional control over desired flow, pressure ratio, and packaging size.

While the gear box 200 and clutch 100 are shown acting in combination in the FIGS. 2A and 2B, either can be used independently of the other in alternative embodiments.

Figure 3:
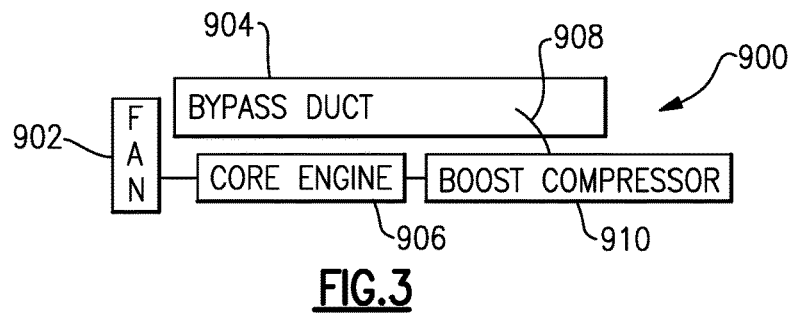
FIG. 3 shows a third embodiment.

FIG. 3 shows an embodiment 900, wherein the air delivered through a channel 908 to a boost compressor 910 is from a single bypass duct 904. That is, there is only one duct that receives air not directed into the compressor. A single stage fan 902 delivers air into the bypass duct 904, and further into a core engine 906, which includes a compressor, a combustor, and a turbine section, and the turbine section drives the boost compressor 910. For purposes of interpreting the claim, in this embodiment, the bypass duct 902 would be a low pressure duct.

Figure 4:
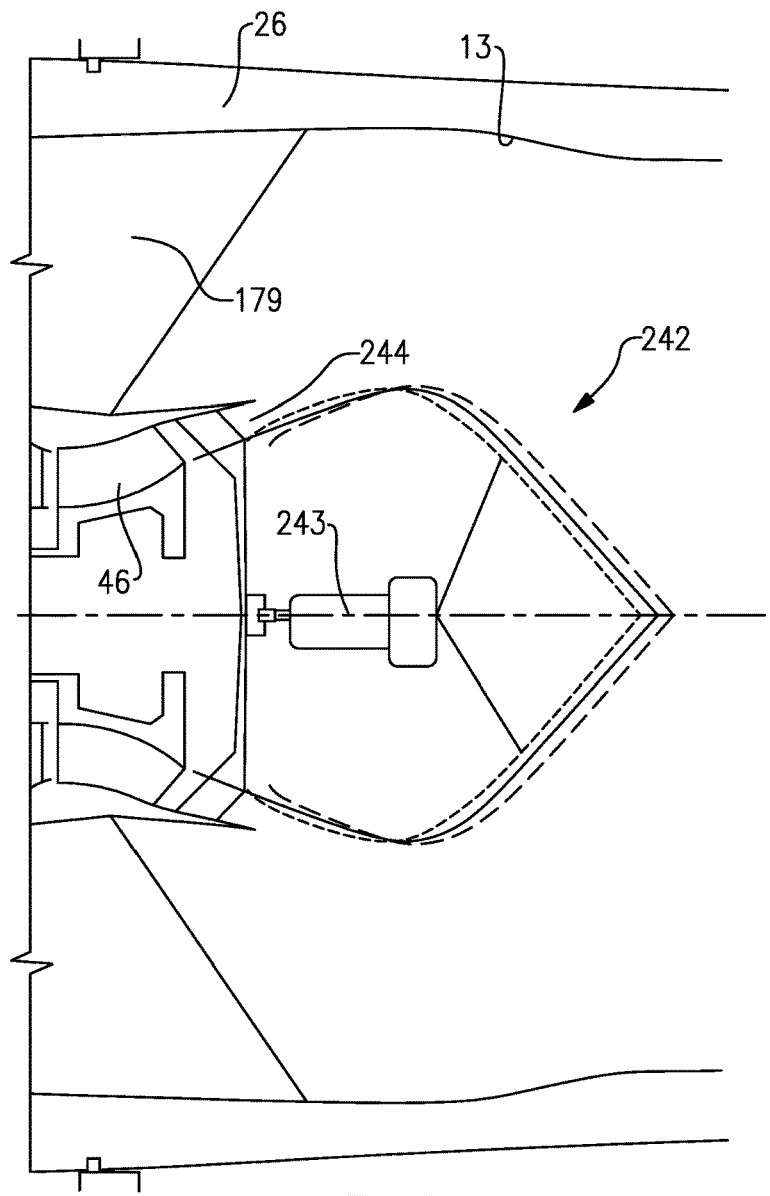
FIG. 4 shows yet another feature.

FIG. 4 shows a variable exhaust cone 242 having an actuator 243 shown schematically, such that the cross-sectional area of an outlet 244 can be varied. This can provide additional control over the discharge of air downstream of the boost compressor 46. This variable exhaust cone 242 can be utilized to resist or facilitate flow across the boost compressor 46, such that the volume of air passing across the boost compressor 46, compared to the volume of air passing to the outlet 61 can be controlled.

Although an embodiment of this invention has been disclosed, a worker of ordinary skill in this art would recognize that certain modifications would come within the scope of this disclosure. For that reason, the following claims should be studied to determine the true scope and content of this disclosure.

The invention claimed is:

1. A gas turbine engine comprising:
   a fan rotor including at least one stage, with said at least one stage delivering a first portion of air into a low pressure duct, and a second portion of air into a main compressor, said main compressor being driven by a turbine rotor, and said fan rotor being driven by a fan drive turbine;
   a channel selectively communicating air from said first portion of air in said low pressure duct across a boost compressor;
   air downstream of said boost compressor being delivered into an exhaust gas downstream of said fan drive turbine;
   an augmentor section positioned adjacent an exhaust nozzle and air from said boost compressor being directed towards said augmentor section;
   wherein a valve selectively blocks or allows flow through said low pressure duct to an outlet, and when the valve is blocking flow, a greater volume of said air is moved into said channel and across the boost compressor;
   wherein said boost compressor is driven by said fan drive turbine;
   wherein a gear box is positioned between said fan drive turbine and said boost compressor, with said gear box affecting a speed change between said fan drive turbine and said boost compressor;
   wherein a connection between said gear box and said boost compressor is a flexible connection;
   wherein a clutch selectively connects or disconnects drive from said gear box said boost compressor; and
   wherein said clutch is moved to connect drive from said gear box to said boost compressor when said valve blocks flow through said low pressure duct to said outlet, and said clutch disconnects drive from said gear box to said boost compressor when said valve allows flow from said low pressure duct to said outlet.

* * * * *